United States Patent

Moreno et al.

(10) Patent No.: US 9,363,225 B2
(45) Date of Patent: Jun. 7, 2016

(54) CONNECTING LAYER-2 DOMAINS OVER LAYER-3 NETWORKS

(75) Inventors: Victor Moreno, Carlsbad, CA (US); Dhananjaya Rao, Milpitas, CA (US); Sanjay Sane, Fremont, CA (US); Sameer Merchant, San Jose, CA (US); Hasmit Grover, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 883 days.

(21) Appl. No.: 13/349,376

(22) Filed: Jan. 12, 2012

(65) Prior Publication Data

US 2013/0182604 A1    Jul. 18, 2013

(51) Int. Cl.
*H04L 12/28* (2006.01)
*H04L 29/12* (2006.01)
*H04L 12/701* (2013.01)
*H04L 12/721* (2013.01)
*H04L 12/747* (2013.01)

(52) U.S. Cl.
CPC .............. *H04L 61/103* (2013.01); *H04L 45/00* (2013.01); *H04L 45/66* (2013.01); *H04L 45/742* (2013.01)

(58) Field of Classification Search
CPC ............ H04L 12/4633; H04L 29/1208; H04L 61/103; H04L 45/64; H04L 29/12018; H04L 45/021; H04L 45/08; H04L 45/32; H04L 45/54; H04L 45/66; H04L 45/742; H04L 45/00
See application file for complete search history.

(56) References Cited

U.S. PATENT DOCUMENTS

| | | | |
|---|---|---|---|
| 7,415,028 B1 | 8/2008 | Allam | |
| 2003/0076845 A1* | 4/2003 | Yokota et al. | 370/401 |
| 2005/0286518 A1* | 12/2005 | Park et al. | 370/389 |
| 2006/0126614 A1* | 6/2006 | Logan | 370/389 |
| 2007/0115967 A1 | 5/2007 | Vandenberghe et al. | |
| 2008/0186968 A1 | 8/2008 | Farinacci et al. | |
| 2009/0037607 A1* | 2/2009 | Farinacci et al. | 709/249 |
| 2010/0040072 A1* | 2/2010 | Kitada | H04L 45/02 370/400 |
| 2010/0226381 A1 | 9/2010 | Mehta et al. | |
| 2011/0206047 A1* | 8/2011 | Donthamsetty et al. | 370/392 |

(Continued)

FOREIGN PATENT DOCUMENTS

WO    WO 2011150396    12/2011

OTHER PUBLICATIONS

"Scale Data Centers with Cisco FabricPath," Cisco, White Paper, Jan. 2012, pp. 1-7.

(Continued)

*Primary Examiner* — Hoang-Chuong Vu
(74) *Attorney, Agent, or Firm* — Haynes and Boone, LLP

(57) ABSTRACT

In one embodiment, a method includes building an address resolution cache for a layer-3 router in a first layer-2 datacenter, where the address resolution cache includes a plurality of entries, each of the entries containing a host network address, a host hardware address, and a switch identifier for a switch serving a host, intercepting an address resolution flood within the first layer-2 datacenter that seeks address resolution for a host in a second layer-2 datacenter, and generating a response to the address resolution flood that indicates a source in the second layer-2 datacenter, where data indicating the source in the second layer-2 datacenter is accessed from the address resolution cache.

18 Claims, 2 Drawing Sheets

(56) References Cited

U.S. PATENT DOCUMENTS

| | | | |
|---|---|---|---|
| 2011/0292939 A1* | 12/2011 | Subramaian | H04L 45/54 370/392 |
| 2011/0317703 A1* | 12/2011 | Dunbar et al. | 370/392 |
| 2012/0014386 A1* | 1/2012 | Xiong et al. | 370/392 |
| 2012/0014387 A1* | 1/2012 | Dunbar et al. | 370/395.53 |
| 2013/0044636 A1* | 2/2013 | Koponen | H04L 47/12 370/254 |
| 2013/0044757 A1* | 2/2013 | Rai | H04L 47/125 370/395.53 |

OTHER PUBLICATIONS

"Cisco Overlay Transport Virtualization Technology Introduction and Deployment Considerations," Cisco, White Paper, Dec. 9, 2011, 72 pages.

International Search Report and Written Opinion received in Patent Cooperation Treaty Application No. PCT/US13/20943, dated Mar. 26, 2013, 6 pages.

Dalela, Ashish, "Datacenter Solution Approaches," retrieved from http://tools.ietf.org/pdf/draft-dalela-dc-approaches-00.pdf on Feb. 27, 2013, 24 pages.

EPO, Supplementary European Search Report, Application No. 13735784.4, Jun. 11, 2015, 9 pages.

Vijay Mann, et al; "Identity: a data center network fabric to enable co-existence of identical addresses," IBM Research-India, Fourth International Conference on, Jan. 3, 2012 IEEE, 10 pages.

Mark Buchmann, "Nexus Feature—FabricPath", Apr. 6, 2011, http://blog.thinkahead.com/nexus-feature-fabricpath , Apr. 7, 2011, 12 pages.

CN, First Office Action, Application No. 201380005373.1, Dated Feb. 2, 2016, 20 pgs.

* cited by examiner

CONNECTING LAYER-2 DOMAINS OVER LAYER-3 NETWORKS

TECHNICAL FIELD

The present disclosure relates generally to enlarging layer-2 domains over layer-3 connections.

BACKGROUND

The creation of large layer-2 domains is a present industry trend. For instance, a datacenter in which host computers are connected to each other using Ethernet or other layer-2 technology is an example of a type of layer-2 domain. In such a datacenter, host computers communicate with each other using their Media Access Control (MAC) addresses. Communication between and among the computers is provided by switches that pass frames to their desired destination MAC address. A larger layer-2 domain may be created by connecting multiple layer-2 datacenters over a layer-3 network, such as the Internet.

Currently, networking technology such as FabricPath™/Transparent Interconnection of Lots of Links (TRILL) and Overlay Transport Virtualization (OTV) attempt to make the scaling of layer-2 beyond its current limits a reality. Each technology has a series of benefits that make it ideal for a certain role in the network. In general, FabricPath™ technology fits well within a data center, while OTV is well suited to interconnect data centers across any transport that is Internet Protocol (IP) enabled. FabricPath™ technology manages information within the layer-2 switches by mapping host addresses to switch identifiers (IDs) in edge devices only, and only on a conversational-learning basis. Therefore, core switches do not build MAC address tables, and edge switches build MAC address tables only for hosts with which they are in communication.

In FabricPath™ technology, a switch associated with a source host receives data from the source host and encapsulates the data to create a frame. The switch creates the frame by adding a header that specifies a switch ID of a switch associated with a destination. The switch at the destination (within the same layer-2 domain) de-encapsulates the data and passes the data to the destination host.

OTV provides a layer-2 connection between two or more layer-2 domains by placing a router at an edge of a layer-2 domain where the router maintains a table of MAC addresses for known hosts. This OTV enabled layer-3 router sends a frame over an inter-connecting layer-3 network (using appropriate overhead) to another OTV router at another layer-2 domain. This is termed "MAC routing." Hosts within separate layer-2 domains communicate using MAC addresses with the layer-3 routers acting as intermediaries in the layer-3 portions.

Today the two technologies are loosely coupled, which can result in inefficiencies at the hand-off point between the FabricPath™ technology and OTV portions of the network. For example, relatively large amounts of MAC address information may be stored at boundary devices between OTV and FabricPath™ technology. Conventional OTV builds and maintains the MAC address table in the data plane using Application Specific Integrated Circuit (ASIC) hardware memory, which is relatively expensive. An OTV router will seek to build a table of MAC addresses containing the MAC addresses for all of the hosts in each of the connected layer-2 domains, but in a scenario wherein there are many hosts and/or many layer-2 domains, the size of the table can grow prohibitively large. Also, conventional layer-2 Address Resolution Protocol (ARP) flooding may result in an excessive amount of traffic in scenarios where a multitude of layer-2 domains are connected.

DESCRIPTION

Overview

Figure 1:
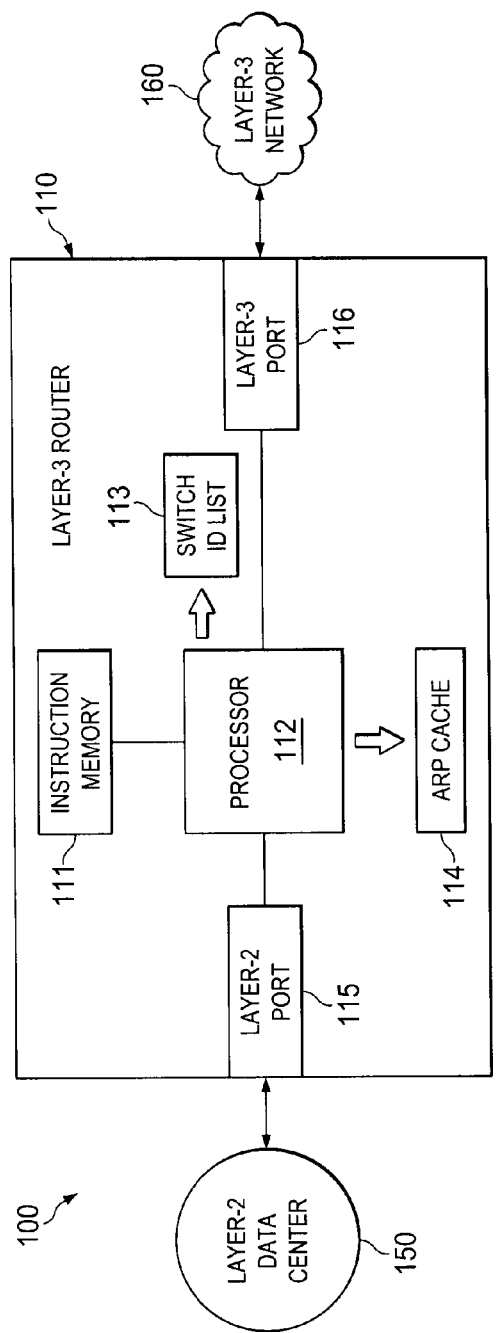
FIG. 1 is an illustration of an example system adapted according to one embodiment.

In one embodiment, a method includes building an address resolution cache for a layer-3 router in a first layer-2 datacenter, where the address resolution cache includes a plurality of entries, each of the entries containing a host network address, a host hardware address, and a switch identifier for a switch serving a host, intercepting an address resolution flood within the first layer-2 datacenter that seeks address resolution for a host in a second layer-2 datacenter, and generating a response to the address resolution flood that indicates a source in the second layer-2 datacenter, where data indicating the source in the second layer-2 datacenter is accessed from the address resolution cache.

In another embodiment, an apparatus includes a first layer-3 network router in a first layer-2 datacenter. The first layer-3 network router includes a layer-2 port in communication with a layer-2 switch in the first datacenter, a layer-3 port in communication with a layer-3 network and with a second layer-3 router at a second layer-2 datacenter, a processor in communication with the layer-3 port and the layer-2 port, and a memory in communication with the processor, the memory including instructions executable by the processor to perform the following operations: (a) storing address resolution information that provides the following information for a plurality of hosts located in the first and the second datacenters (i) hardware address, (ii) network address, and (iii) switch identifier, (b) in response to receiving an address resolution request from a host in the first datacenter, retrieving address resolution data for a host in the second data center from the address resolution cache, and (c) generating a frame responsive to the address resolution request and including source data indicating a source in the second datacenter, and (d) relaying the frame to the host in the first datacenter via the layer-2 port.

In another embodiment, logic is encoded on one or more tangible media for execution and when executed is operable to build an address resolution cache for a layer-3 router, where the address resolution cache includes a plurality of entries, each of the entries containing a host network address, a host hardware address, and a switch identifier for a switch serving a host, intercept an address resolution request within a local layer-2 domain from a first host, the first host located in the local layer-2 domain, the address resolution request seeking address resolution for a second host located in a remote layer-2 domain, and generate a response by the layer-3 router in the local domain to the address resolution request that impersonates a response from the second host, where the response is generated by creating a frame by accessing from the address resolution cache address data associated with the second host.

In another embodiment, a method includes examining, by a layer-3 router in a first layer-2 domain, traffic at the layer-3 router for switch hardware addresseslayer-3, implementing a table in the layer-3 router for the list of switch hardware addresses, and accessing at least one of the switch hardware addresses to send a frame from a first switch in the first layer-2 domain to a second switch in a second layer-2 domain over a layer-3 network.

In yet another embodiment, a method includes receiving, by a layer-3 router in a layer-2 domain, a frame from a source switch in the layer-2 domain, the frame including a MAC-in-MAC encapsulation wherein an inner encapsulation includes source and destination hardware addresses and wherein an outer encapsulation includes source and destination switch IDs, and routing the frame over a layer-3 domain to a second layer-2 domain by adding a layer-3 header to the frame and preserving the MAC-in-MAC encapsulation thereof.

DESCRIPTION OF EXAMPLE EMBODIMENTS

In order to enlarge layer-2 domains, various embodiments improve upon layer-3 connection functionality. Thus, in one example, a layer-2 domain includes a layer-3 router at its edge that connects the layer-2 domain to other layer-2 domains. Within the layer-2 domain, edge switches build host MAC address tables using conversational learning, and core switches build tables of switch IDs, as in a conventional system that uses FabricPath™ technology. The layer-3 router builds and maintains a switch ID table rather than a host MAC address table. In a typical configuration there are fewer switches than there are hosts, and thus the switch ID table is usually expected to be smaller than a host MAC address table in a conventional OTV system. In one particular example, a layer-3 router operates similar to that of a core switch using FabricPath™ technology, in this regard, by keeping a hardware table of switch IDs and omitting host MAC addresses therefrom.

In a further example embodiment, the layer-3 router for a particular layer-2 domain caches data from ARP requests in memory. Each entry in the ARP cache includes a host IP address, a host MAC address, and a switch ID associated with that host. The layer-3 router advertises its ARP cache entries to other layer-3 routers so that the layer-3 routers build and maintain fairly comprehensive ARP caches. ARP caches are used to avoid layer-2 flooding over multiple domains. Thus, in one example, a layer-3 router receives an ARP request from a host within its domain. Rather than pass the ARP flood to other layer-2 domains, the layer-3 router looks within its own ARP cache, and if it has the information desired by the requesting host, generates a frame to send back to the requesting host that purports to be from the destination whose address is to be resolved.

The above-described embodiments may provide one or more advantages over traditional layer-2 enlargement. Whereas a conventional OTV interface would create a large host MAC address table, the above-described embodiments provide comprehensive address information at the layer-3 router by implementing ARP caches in memory and storing switch IDs in the hardware table. Therefore, hardware memory is conserved. Furthermore, ARP flooding across layer-2 domains can be minimized by utilizing ARP cache information within a layer-2 domain. Example embodiments are described in more detail below with respect to FIGS. 1-4.

FIG. 1 is an illustration of an example system 100 adapted according to one embodiment. Layer-3 router 110 includes layer-2 port 115 and layer-3 port 116. Router 110 serves layer-2 datacenter 150 by connecting datacenter 150 to layer-3 network 160 (which may be connected to other layer-3 routers at other datacenters that are not shown in FIG. 1 for ease of illustration). In this example, router 110 is an edge router serving datacenter 150. Network 160 may include any layer-3 network, such as but not limited to the Internet. In one example, datacenter 150 may include an enterprise network or Local Area Network (LAN) that serves an entity, such as a business or a consumer household, and further wherein traffic within datacenter 150 is switched according to a layer-2 protocol such as, but not limited to, Ethernet. As used in this example, the layer-3 router 110 communicates over a layer-3 network and is also capable of communicating within the layer-2 datacenter 150. Such layer-3 router 110 may also be referred to as an OTV edge device in some embodiments.

Router 110 communicates bi-directionally with datacenter 150 and network 160 via ports 115 and 116, respectively. Router 110 is shown with only two ports 115, 116, but it is understood that the scope of embodiments is not limited to two ports. A given embodiment may include any appropriate number of layer-2 ports and layer-3 ports.

Router 110 includes instruction memory 111, which holds computer executable code, which is accessed and executed by processor 112. Processor 112 provides the actions described herein by executing the code.

In contrast with a conventional OTV router, router 110 builds and maintains switch ID list 113 in hardware memory and ARP cache 114 in RAM or other inexpensive, writable memory. In other embodiments, the particular type of memories used to store list 113 and ARP cache 114 may be different so that the scope of embodiments is not limited to any particular type of memory. However, some embodiments may be implemented by modifying an otherwise conventional OTV router, where the host MAC address table in hardware ASIC memory is replaced by the switch ID table 113, and wherein existing RAM or additional RAM is used to store the ARP cache 114. Switch ID list 113 and ARP cache 114 are described in more detail below.

In the example of FIG. 1, list 113 functions as a forwarding table, and the entries therein are limited to the switch IDs (also called bridge IDs in some embodiments) of the layer-2 switches. When router 110 communicates with another router at a layer-2 datacenter, router 110 receives traffic which is MAC-in-MAC encapsulated. In conventional OTV, router 110 would take the outer header off and learn and advertise the inner source MAC addresses to other layer-3 routers. However, in this example embodiment router 110 only learns and advertises (with respect to list 113) the source MAC addresses in the outer header, which are the switch IDs of the layer-2 switches.

Further in this example, router 110 creates an ARP cache 114 in software that holds the mapping between IP addresses and MAC addresses of the hosts in the layer-2 network (except in some embodiments those that are on the local site of router 110). ARP cache 114 may be populated in any number of ways. In one embodiment, ARP cache 114 is populated by snooping ARP replies at router 110. In another embodiment, router 110 builds ARP cache 114 by the control plane at learning time, where router 110 advertises the MAC-to-IP mappings for the internal header at learning time.

Both techniques are part of the definition of conventional OTV functionality, and their details are outside of the scope of the present disclosure. Over and above conventional OTV functionality, the present embodiment includes the concept that the cache is populated with a three-tuple of (Switch-ID, host MAC, host IP), rather than the traditional two-tuple of (host MAC, host IP). The switch ID in the three-tuple is that of the remote layer-2 switch that is directly connected to the particular host. Again, router 110 may populate ARP cache 114 by snooping of ARP replies, by explicit advertisement in the OTV control plane, or by any other appropriate method. The scope of embodiments is not limited to any particular method for populating the ARP cache 114.

After router 110 builds the ARP cache 114 with the three-tuple of (Switch-ID, host MAC, host IP), the router 110 can reply to some ARP requests issued for remote MACs (i.e., ARP requests for MACs of hosts at a different datacenter and served by a remote switch). Specifically, in one embodiment router 110 impersonates the remote switch from the layer-2 perspective when issuing those replies. Router 110 uses the switch ID in the cache 114 as the source MAC address for the outer layer-2 header that encapsulates the ARP reply. By impersonating the remote switch, the router 110 generates the traffic necessary for the local layer-2 switches to complete the conversational learning of the remote MAC addresses with the correct remote switch-ID.

Figure 2:
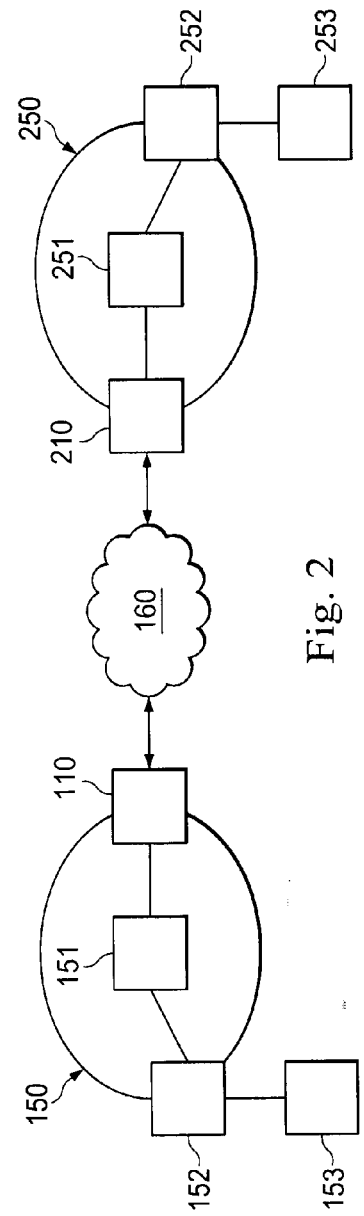
FIG. 2 is an illustration of an example network arrangement adapted according to one embodiment.

FIG. 2 is an illustration of example network arrangement 200 adapted according to one embodiment. FIG. 2 includes router 110 in datacenter 150. Router 110 is connected to core switch 151 and edge switch 152 using layer-2 protocols. In this example, a core switch refers to a switch that is directly connected only to other switches, and an edge switch refers to a switch that is directly connected to at least one host (e.g., host 153).

Datacenter 150 may be implemented using FabricPath™ technology, which uses conversational learning as described above to build and maintain switch ID to host MAC address tables in edge routers. However, the scope of embodiments is not limited to implementing datacenter 150 (or datacenter 150) strictly according to FabricPath™ technology as any appropriate layer-2 datacenter implementation may be adopted, such as TRILL or other technology.

Datacenter 150 is connected to layer-2 datacenter 250 by layer-3 network 160. Whereas switches 151, 152, 251, 252 provide layer-2 switching, routers 110, 210 provide capability to pass frames between the datacenters 150, 250 over layer-3 network 160. Routers 110, 210 may use any appropriate layer-3 overhead and protocols to relay communications between layer-2 datacenters 150, 250, such as that used by conventional OTV. The various embodiments are not limited to any specific technique for layer-3 communications.

Datacenter 150 includes host device 153, and datacenter 250 includes host device 253. Host devices 153, 253 may include any kind of networked device, such as a personal computer, tablet computer, server computer, video conferencing console, gaming console, and/or the like. Furthermore, while datacenters 150, 250 are each shown with only two switches and one host for simplicity, the scope of embodiments is not so limited. Various embodiments may include any appropriate number of core switches, edge switches, hosts, and routers. Moreover, datacenter 150 is shown connected to only one other datacenter (datacenter 250), though other embodiments may connect any appropriate number of datacenters together over network 160 and/or other layer-3 networks. The principles described herein can be scaled to a larger number of datacenters.

The following is an example of behavior of the various devices in network configuration 200 at an initial state when tables are assumed empty. Host 153 sends an ARP request for host 253. In this example, the ARP request is sent as a broadcast, since host 153 does not know a MAC address for host 253.

Switch 152 MAC encapsulates the ARP request broadcast with a source indication of switch 152 and a destination marked as flood. Any intermediate switches, such as switch 151, receive the broadcast frame and relay it to endpoints.

Router 110 eventually receives the broadcast frame. In response to receiving the frame, router 110 learns switch 152 by adding a switch ID for switch 152 to its forwarding table (e.g., table 113 of FIG. 1) and advertises the switch ID of switch 152 to its layer-3 peers (e.g., router 210 and others, not shown). Additionally, router 110 also sends the ARP request packet to its OTV peers.

Router 210 then receives the broadcast over layer-3 from router 110. The frame still has an outer MAC header with a source of switch 152 and a broadcast destination. Router 210 relays the frame throughout datacenter 250, through core switch 251 to edge switch 252.

Switch 252 receives the broadcast, removes the outer MAC encapsulation and delivers the ARP request to host 253. In some embodiments consistent with a more strict view of conversational learning, switch 252 would not program the binding (switch 152, host 153) at this point since the traffic is not destined to host 253 specifically. But other embodiments may program the binding, depending on the specific rules of conversational learning.

Host 253 then ARP replies with a unicast frame to host 153. Switch 252 receives the ARP reply, and encapsulates the ARP reply to the layer-2 flood tree. In some embodiments, switch 252 learns host 153 by adding its MAC address and switch ID to its table at this time (if switch 252 has not done so already after receiving the broadcast). Switch 252 uses the flood tree since host 153 is an unknown unicast destination to switch 252 at this point in time.

The flood makes its way to router 210 through any intermediate switches, such as switch 251. Router 210 learns switch 252 by saving the switch ID of switch 252 to its forwarding table and advertises switch 252 to its layer-3 peers. Router 210 drops the flood at this point.

Furthermore, router 210 snoops the ARP reply from switch 252 and advertises the ARP reply tuple (host 253 MAC, switch 252 ID, host 253 IP) to its layer-3 peers, including router 110. Router 110 receives the ARP reply advertisement from router 210 and populates its ARP cache with the three tuple (host 253 MAC, switch 252 ID, host 253 IP).

The ARP process at host 153 then re-tries (e.g., per TCP protocols) for host 253 and sends an ARP request again. The ARP request is intercepted by router 110, which sends an ARP reply back to host 153. Router 110 generates the frame by MAC encapsulating the data with outer Source Address (SA)=switch 252, outer Destination Address (DA)=switch 152, innerSA=host 253 MAC and innerDA=host 153 MAC.

Switch 152 receives the encapsulated ARP reply, de-encapsulates the frame, and programs its forwarding table to show that host 253 MAC is reachable via switch 252, per layer-2 conversational learning rules.

Host 153 then sends a unicast frame to host 253, where the unicast frame is not an ARP request or reply. The unicast frame has a MAC encapsulation that includes the source and destination host MAC addresses. Switch 152 then encapsulates the frame with outerDA=switch 252 and outerSA=switch 152. This is a MAC-in-MAC encapsulation, where the inner MAC addresses are source and destination host addresses and the outer MAC addresses are source and destination switch IDs.

The encapsulated frame arrives at router 110 and is now layer-3 encapsulated to router 210. In this example, the layer-2 frame encapsulation (the MAC-in-MAC encapsulation described above) remains intact. Router 210 receives the encapsulated frame, removes the layer-3 header and forwards the frame to switch 252 per the layer-2 encapsulation header. At this point the MAC-in-MAC encapsulation is still preserved.

Switch 252 receives the frame, then removes the outer layer-2 encapsulation that refers to the switch IDs, and delivers the frame to host 253. Based on the MAC-in-MAC header contents of the layer-2 encapsulation, switch 252 will now program in its forwarding table host 153 as reachable via switch 152. In contrast to the flood frame sent to host 253 earlier, reception of this unicast frame causes switch 252 to update its forwarding tables per the rules of layer-2 conversational learning, since the received packet is directed to host 253 specifically, which is locally connected to switch 252.

According to the example of FIG. 2, two or more layer-2 domains may be interconnected using routers, such as routers 110, 210, by having the routers only learn switch IDs in their forwarding tables and leveraging proxy-ARP functionality to limit broadcast and unknown unicast flooding between different networks. This embodiment extends the benefits of conversational learning (e.g., conversational learning in FabricPath™ technology) beyond the scope of a single layer-2 network. The embodiment also solves the scalability limitations of the layer-3 routers by limiting the amount of information in the layer-3 forwarding tables, thereby avoiding the conventional scenario wherein a layer-3 router learns all layer-2 hosts across a multitude of domains.

The example behavior above illustrates only one way for the routers 110, 210 to populate ARP caches and respond to ARP requests. In another example, router 110 terminates all ARP requests coming from within datacenter 150. Upon receiving an ARP request from host 153 to resolve the address of host 253, router 110 1) adds switch 152 to its forwarding table, 2) advertises the switch 152 forwarding table entry to router 210, 3) caches the three-tuple (host 153 MAC, switch 152 ID, host 153 IP) in its ARP cache, 4) advertises the three-tuple to router 210, and 5) drops the flood.

Assuming that router 210 behaves in the same way, after some amount of time and due to normal operation router 210 will add switch 252 to its forwarding table, learn the three-tuple (host 253 MAC, switch 252 ID, host 253 IP), and advertise both the forwarding table entry and the ARP cache three-tuple to router 110. In this way, a subsequent ARP request from host 153 for host 253 will be answered by router 110 based on an entry in router 110's ARP cache. Such an example embodiment cuts down on all, or nearly all, floods between and among layer-2 domains.

Thus, the two example embodiments above provide one technique wherein ARP replies are cached and one technique wherein ARP requests are cached. Other embodiments may populate ARP caches, drop or pass ARP request floods, and answer ARP requests in any appropriate manner.

Figure 3:
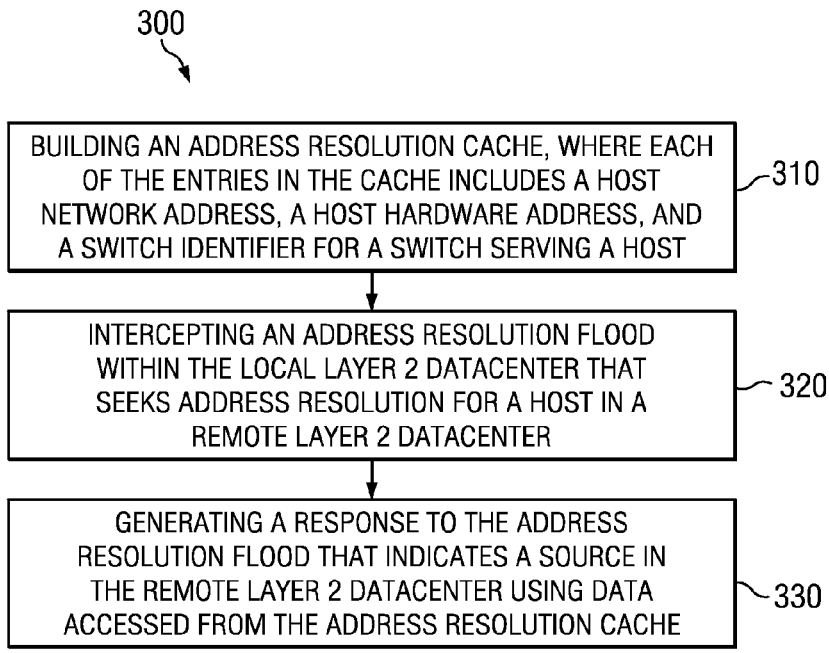
FIG. 3 is an illustration of an example method adapted according to an embodiment.

FIG. 3 is an illustration of example method 300 adapted according to an embodiment. Method 300 may be performed by a router, such as router 110 of FIG. 2. Specifically, in some embodiments, method 300 is performed by hardware and/or one or more software processes executing on a processor at the router. The functionality described in method 300 may be implemented in addition to, or alternatively to, conventional layer-2 and layer-3 functionality.

In block 310, the router builds an address resolution cache. In this example, the address resolution cache includes multiple entries, and each of the entries includes a hardware address (e.g., a MAC address) of a host, a network address of a host (e.g., an IP address), and a switch ID of a switch associated with the host (e.g., a MAC address of the switch).

As explained above, the various embodiments may populate the address resolution cache in any appropriate manner. One example embodiment caches address information of a local host that sends an ARP request. Another example embodiment caches information contained in address resolution replies. In some embodiments, routers advertise new cache entries so that routers in other layer-2 domains may populate their caches with the advertised information. Any appropriate technique may be used to populate the address resolution cache in block 310.

In block 320, the router intercepts an address resolution flood within its local layer-2 datacenter. The address resolution flood seeks to resolve an address for a host in a remote layer-2 datacenter. In one example, a host in the local layer-2 datacenter sends an ARP request as a flood within the data center. The router receives the flood and checks within its address resolution cache for data that would satisfy the request.

In block 330, the router generates a response to the address resolution flood. In this example, the router checks within its address resolution cache and identifies data in the address resolution cache that satisfies the address resolution request carried in the flood.

The router then generates an address resolution response using information from the cache. In doing so, the router impersonates a source in the remote layer-2 datacenter. The response may take the form of a layer-2 frame that has header data indicating a source host the same as the requested host and a source switch ID of an edge switch supporting the requested host. Thus, even though the frame is generated by the local router, it appears to be generated by the remote host that was the object of the address resolution request.

The scope of embodiments is not limited to the specific method shown in FIG. 3. For instance, various embodiments may add, omit, rearrange, or modify one or more actions. For example, various embodiments may perform method 300 multiple times as long as additional addresses are requested to be resolved. In some embodiments, routers may terminate floods locally, either responding to resolve a requested address or simply learning addresses of the sender and dropping the request thereafter. In other embodiments, a local router may relay over layer-3 those address resolution requests that it cannot satisfy locally.

Figure 4:
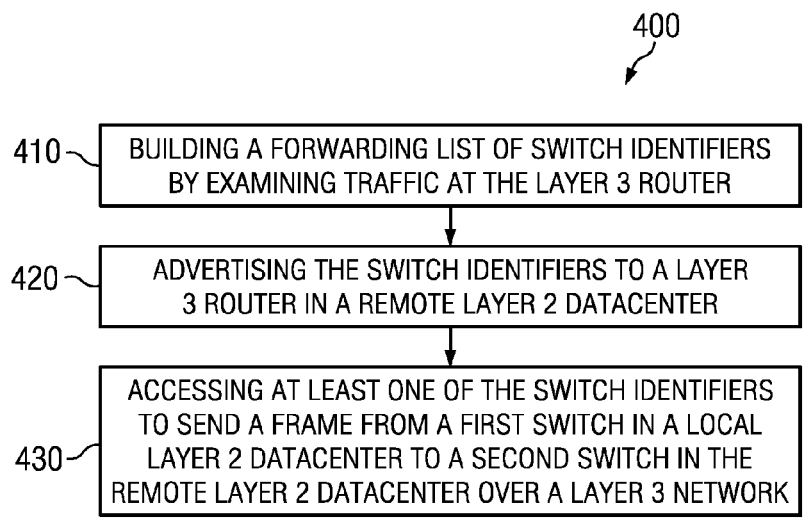
FIG. 4 is an illustration of an example method adapted according to an embodiment.

FIG. 4 is an illustration of example method 400 adapted according to an embodiment. Method 400 may be performed by a router, such as router 110 of FIG. 2. Specifically, in some embodiments, method 400 is performed by hardware and/or one or more software processes executing on a processor at the router. The functionality described in method 400 may be implemented in addition to, or alternatively to, conventional layer-2 and layer-3 functionality.

In block 410, the router builds a forwarding list of switch IDs by examining traffic. The router may sniff address resolution replies, address resolution requests, data packets, and/or any other communications it receives. In some examples the router builds and maintains the list of switch IDs in hardware memory (e.g., such as in ASIC), though various embodiments may maintain a list of switch IDs in any appropriate memory device.

In block 420, the router advertises the switch IDs to other layer-3 routers in remote datacenters. The other layer-3 routers may save the data in their forwarding tables as well.

In block 430, the router accesses at least one of the switch identifiers in its forwarding table to send a frame from its local datacenter to a remote datacenter over a layer-3 network. Thus, the router uses its forwarding table to forward frames to remote switches. In this example, the router receives a frame that is MAC-in-MAC encapsulated so that the inner MAC encapsulation includes source and destination host MAC addresses and the outer MAC encapsulation includes the source and destination switch IDs. This MAC-in-MAC encapsulation is preserved at the router, which places an additional layer-3 header onto the frame and forwards the frame as a layer-3 packet to a receiving router. Although not a part of method 400, it is noted that the MAC-in-MAC encapsulation is preserved until the frame reaches the destination switch.

Method 400 may be implemented by modifying a conventional OTV router or may be implemented using any layer-3 router than serves a local layer-2 datacenter. In other words, various embodiments may or may not be built upon OTV, though embodiments of method 400 may employ source learning and advertising.

Methods 300 and 400 may be implemented together to make a layer-3 router more efficient than conventional routers. For instance, rather than storing host addresses in a forwarding table, method 400 stores switch IDs. In most instances, the number of switch IDs will be less than the number of hosts, so that it can generally be expected that storing switch IDs is more space efficient. Nevertheless, host addresses are still stored by the router, but they are stored in cheaper memory as an address resolution cache.

Thus, various embodiments use router memory more efficiently by moving host addresses to software storage. But this change does not sacrifice the benefits of conversational learning or the isolation of layer-2 domains. As shown in the examples above, conversational learning may be used to populate address resolution caches, and the various layer-2 domains are still isolated from each other.

When implemented via computer-executable instructions, various elements of embodiments of the present disclosure are in essence the software code defining the operations of such various elements. The executable instructions or software code may be obtained from a tangible readable medium (e.g., a hard drive media, optical media, RAM, EPROM, EEPROM, tape media, cartridge media, flash memory, ROM, memory stick, network storage device, and/or the like). In fact, readable media can include any medium that can store information.

The computer-executable instructions may be executed by a processor, which may include a general purpose Central Processing Unit (CPU), a special purpose CPU (e.g., a digital signal processor), a Field Programmable Gate Array (FPGA), an ASIC, and/or the like. In fact, persons of ordinary skill in the art may utilize any number of suitable structures capable of executing logical operations according to the embodiments of the present disclosure.

It should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method comprising:
performing the following actions in a layer-3 router in a first layer-2 datacenter:
building an address resolution cache for the layer-3 router in the first layer-2 datacenter, where the address resolution cache includes a plurality of entries, each of the entries containing a host network address, a host hardware address, and a switch identifier for a switch serving a host;
intercepting an address resolution flood within the first layer-2 datacenter that seeks address resolution for a host in a second layer-2 datacenter; and
generating a response to the address resolution flood that indicates a source of the response is a switch in the second layer-2 datacenter, where data indicating the source in the second layer-2 datacenter is accessed from the address resolution cache.

2. The method of claim 1 further comprising:
implementing a table in the layer-3 router for a list of switch identifiers; and
accessing at least one of the switch identifiers to send a frame from a first switch in the first layer-2 datacenter to a second switch in the second layer-2 datacenter over a layer-3 network.

3. The method of claim 2 further comprising:
building the list of switch identifiers by examining traffic at the layer-3 router for the switch identifiers; and
advertising the switch identifiers to a layer-3 router in the second layer-2 datacenter.

4. The method of claim 1 in which the layer-3 router comprises an Overlay Transport Virtualization (OTV) router.

5. The method of claim 1 in which the hardware address comprises a MAC address.

6. The method of claim 1 in which the network address comprises an IP address.

7. The method of claim 1 further comprising:
advertising the address resolution cache to a layer-3 router in the second layer-2 datacenter.

8. The method of claim 1 in which building the address resolution cache comprises:
in response to receiving an address resolution request at the layer-3 router from a source host that is not included in the address resolution cache, caching a hardware address, a network address, and a switch ID for the source host; and
caching address resolution data that is advertised by a layer-3 router in the second layer-2 datacenter.

9. The method of claim 1 in which building the address resolution cache comprises:
caching data from address resolution responses received from the second layer-2 data center.

10. A computer program product having a non-transitory computer readable medium tangibly recording computer program logic, the computer program product comprising:
code to perform the following actions in a layer-3 router in a first layer-2 datacenter:
build an address resolution cache for a layer-3 router in a first layer-2 datacenter, where the address resolution cache includes a plurality of entries, each of the entries containing a host network address, a host hardware address, and a switch identifier for a switch serving a host;
intercept an address resolution flood within the first layer-2 datacenter that seeks address resolution for a host in a second layer-2 datacenter; and
generate a response to the address resolution flood that indicates a source of the response is a switch in the second layer-2 datacenter, where data indicating the source in the second layer-2 datacenter is accessed from the address resolution cache.

11. The computer program product of claim 10 further comprising:
code to implement a table in the layer-3 router for a list of switch identifiers; and code to access at least one of the switch identifiers to send a frame from a first switch in the first layer-2 datacenter to a second switch in the second layer-2 datacenter over a layer-3 network.

12. The computer program product of claim 11 further comprising:
    code to build the list of switch identifiers by examining traffic at the layer-3 router for the switch identifiers; and
    code to advertise the switch identifiers to a layer-3 router in the second layer-2 datacenter.

13. The computer program product of claim 10 in which the layer-3 router comprises an Overlay Transport Virtualization (OTV) router.

14. The computer program product of claim 10 in which the hardware address comprises a MAC address.

15. The computer program product of claim 10 in which the network address comprises an IP address.

16. The computer program product of claim 10 further comprising:
    code to advertise the address resolution cache to a layer-3 router in the second layer-2 datacenter.

17. The computer program product of claim 10 in which building the address resolution cache comprises:
    code to, in response to receiving an address resolution request at the layer-3 router from a source host that is not included in the address resolution cache, cache a hardware address, a network address, and a switch ID for the source host; and
    code to cache address resolution data that is advertised by a layer-3 router in the second layer-2 datacenter.

18. The computer program product of claim 10 in which building the address resolution cache comprises:
    code to cache data from address resolution responses received from the second layer-2 data center.

* * * * *